Figure 1:
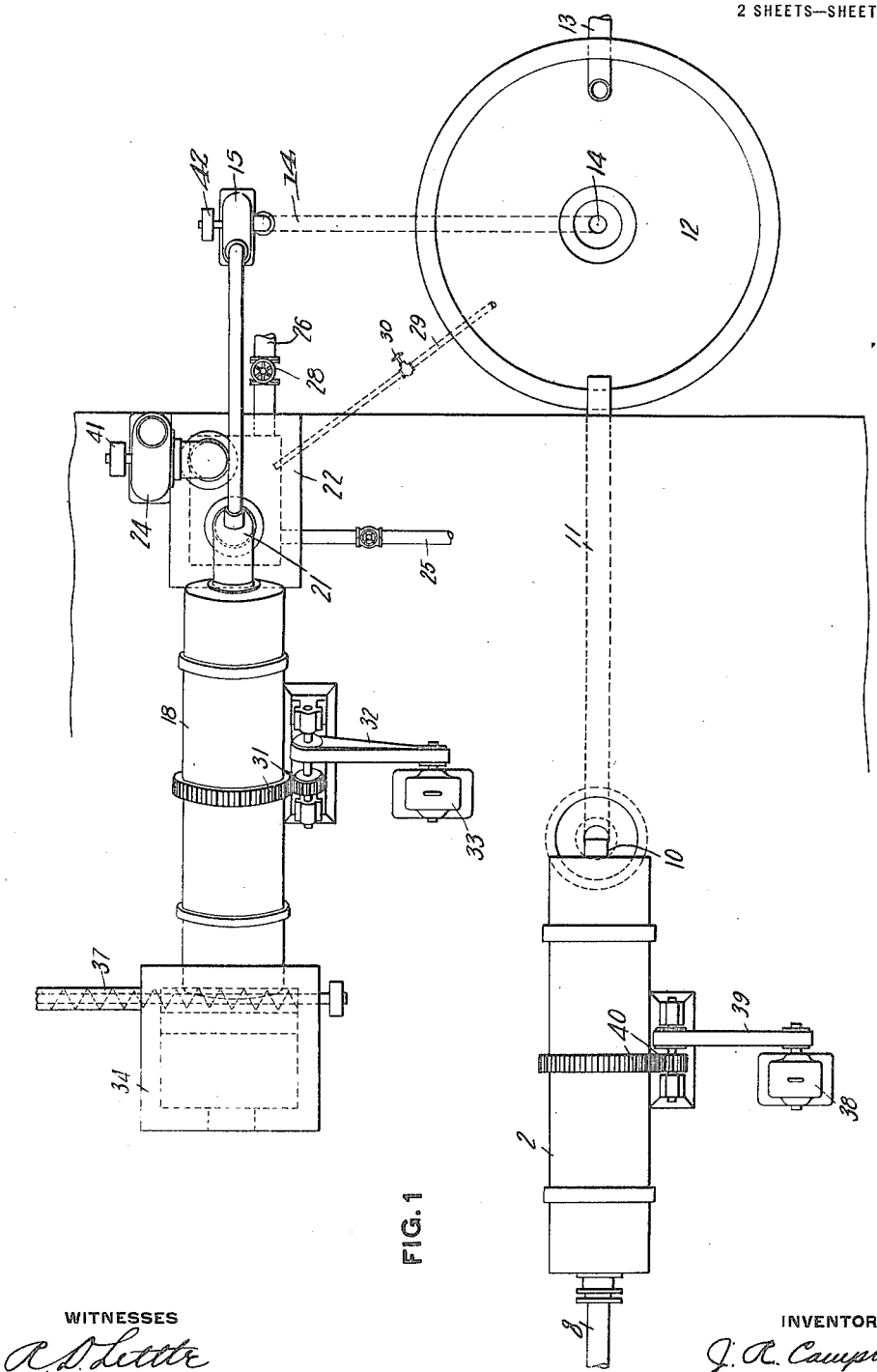

J. R. CAMPBELL & A. F. HOFFMAN.
TREATING MINE WATER.
APPLICATION FILED SEPT. 22, 1914.

1,267,971.

Patented May 28, 1918.
2 SHEETS—SHEET 1.

WITNESSES

INVENTORS
J. R. Campbell
A. F. Hoffman
by his Attorney

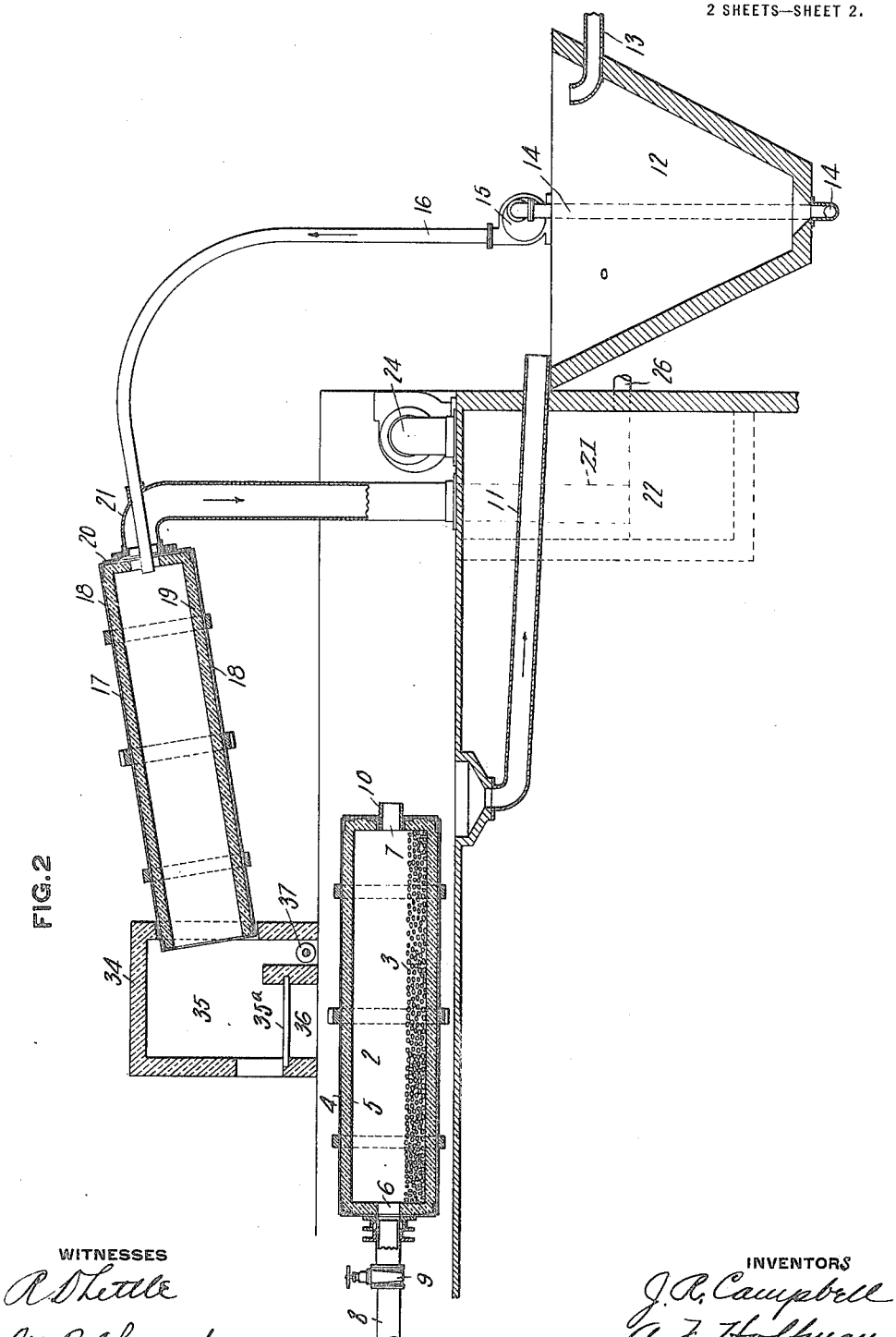

UNITED STATES PATENT OFFICE.

JAMES R. CAMPBELL, OF SCOTTDALE, AND ADDISON F. HOFFMAN, OF PITTSBURGH, PENNSYLVANIA.

TREATING MINE-WATER.

1,267,971.  Specification of Letters Patent.  Patented May 28, 1918.

Application filed September 22, 1914. Serial No. 862,959.

*To all whom it may concern:*

Be it known that we, JAMES R. CAMPBELL and ADDISON F. HOFFMAN, both citizens of the United States, and residents, respectively, of Scottdale, county of Westmoreland, and State of Pennsylvania, and Pittsburgh, county of Allegheny, and State of Pennsylvania, have invented certain new and useful Improvements in Treating Mine-Water, of which the following is a specification.

Our invention relates to the treatment of the impregnated water drained from mines, and while not limited to such use, more particularly relates to the treatment of waste water discharged or removed from coal mines, which is impregnated with iron or other metal salts.

One object of the invention is to provide a novel method of treating such waste water whereby the metallic oxids and any acid contained in the water are recovered therefrom in separated and marketable condition.

Another object of our invention is to provide an improved method of treating the drainage water from mines to neutralize and purify the water, whereby the objections made by local and Government authorities to the usual practice of causing the water to flow into and contaminate conveniently adjacent streams are avoided and overcome without necessarily increasing the cost of operating the mine or mines.

A further object of our invention is to prepare the sludge precipitated in carrying out the invention with water from coal mines, for use as a pigment or for other purposes.

Still further objects of our invention will become apparent as the invention is more fully disclosed hereinafter and is specifically pointed out in the appended claims.

Referring now to the drawings forming part of this specification, Figure 1 is a more or less diagrammatic plan showing one combination of apparatus constructed and arranged and adapted for use in carrying out the method forming this invention.

Figure 2 is a sectional elevation showing the arrangement and relative location of the apparatus illustrated in Fig. 1.

In the accompanying drawings, the numeral 2 designates a rotary ball mill, containing a body 3 of broken limestone or other calcareous material, in the form of loose lumps. The ball mill is cylindrical in cross section, and has a metal shell 4 and a suitable lining 5, a manhole being provided to enable the lining being placed in the ball mill, and an inlet 6 in one end, and outlet 7 in the opposite end of the mill being provided to introduce and discharge the water.

Instead of being in lumps the limestone may be ground or in a finer state of division than would ordinarily be termed as lumps, and flint pebbles or metal balls may be mixed with the limestone to assist in rubbing off small quantities of the limestone from the lumps when the ball mill is rotated.

A pipe or conduit 8 is employed to deliver the raw or untreated water into the ball mill through the inlet 6 at one end thereof, a gate valve 9 being provided on the conduit to regulate and control the flow of water into the mill.

The water is maintained preferably at a level somewhat above the level of the body of calcareous material within the ball mill 2, provision being made to regulate the flow of water from the mill when found necessary. Additions of limestone, slag or other calcareous material are made from time to time, as required in the operation of the ball mill.

A trough or chute 10 is provided on the outlet 7 at the discharge end of the ball mill 2 to deliver the water from the ball mill into the conduit 11 which discharges into the settling tank or pit 12 in which the iron or other metallic salts in the neutralized water, (principally ferric sulfate $(Fe_2(SO_4)_3)$ and ferric hydrate $(Fe_2(OH)_6)$,) are precipitated and allowed to settle in the bottom of the pit.

The ball mill is rotatably mounted in suitable bearings and is driven by the motor 38 through the belt 39 and reducing gearing 40.

When required a conduit will be provided to discharge raw mine water directly into the settling tank or pit 12, instead of passing all of the mine water through the ball mill 2.

The clear and now partly neutralized water in the settling pit 12 is allowed to run therefrom by gravity, through the overflow outlet 13, the water being utilized in industrial work in some instances. When found necessary or desirable the water is allowed to flow as waste into adjacent streams without objection.

A pipe 29 having a valve 30 is used to connect the settling tank 12 with the acid tank 22 to supply water to the tank 22, when necessary in recovering the sulfuric acid.

The precipitate or sludge, as collected at the bottom of the settling pit 12, is pumped through the suction pipe 14 by the pump 15 into a conduit 16 connected at its inlet end to the discharge outlet of the pump and the sludge is discharged from the conduit 16 into the drying or vaporizing end of the rotary kiln or furnace 17 in which the sludge is first dried and then calcined, the discharge end of the pipe or conduit 16 extending into the inlet end of the furnace. Preferably a rotary furnace of the type shown is employed in vaporizing the sulfuric acid in and removing the moisture and acid from the sludge and in forming iron oxid, the furnace having a cylindrical metal shell 18 and a refractory lining 19.

The furnace 17 is inclined lengthwise so as to cause the calcined materials to move from the inlet to the outlet end of the furnace as the furnace rotates, the shell of the furnace being mounted in suitable bearings and being connected by reducing gearing 31 and a belt 32 with a suitable driving motor 33. The lower or discharge end of the furnace 17 opens into a fire place 34 which comprises a combustion chamber 35, ash pit 36, and suitable grate bars 35$^a$.

A screw conveyer 37 in the bottom of the fire place at one end thereof, provides a convenient means for delivering the iron oxid discharged from the furnace 17 to a place of loading.

Obviously gas or oil or waste heat may be employed to heat the furnace instead of the coal fired fire place illustrated.

The upper or inlet end 20 of the calcining furnace 17 is connected to one end of a conduit 21 which extends downwardly into a closed tank or pit 22, the mouth or lower end of the conduit 21 being submerged in the body of fluid maintained in the tank 22, so as to cause the sulfuric acid vapor arising in the furnace from the sludge to pass through the fluid. A suction fan or blower 24, or equivalent stack, is connected to the tank 22 to create and maintain a partial vacuum therein and thereby draw the vapor or fumes from the furnace 17 through the conduit and into the liquid in the tank 22. The fan or blower 24 is provided with a pulley 41 and the pump 15 with a pulley 42, by which the fan and pump are connected to a suitable driving motor.

The tank 22 is provided with a lead or other acid proof lining and is supplied with an inlet 25 through which water is supplied to the tank, and an outlet opening 26 through which the concentrated sulfuric acid passes in being discharged from the tank into a suitable receptacle. A valve on the pipe leading to the inlet 25 regulates and controls the flow of water into the tank 22 and the outlet 26 is provided with a valve 28 to control the flow of acid therefrom.

In some cases the sludge will be transferred from the settling tank to a pile where it will be air dried or partly dried before being fed into the upper or inlet end of the calcining furnace, and when found desirable or necessary the sludge will be delivered from the settling tank into a filter press or a filter wheel, to remove excess moisture therefrom before passing the sludge into the calcining furnace.

In practising our improved method with the novel combination of apparatus which has been described, the impregnated mine water is caused to flow through the conduit 8 into and through the rotating ball mill or tumbling barrel 2, and in passing through the ball mill the water is brought into intimate contact with the surfaces of the limestone or other calcareous material in the ball mill. The pebbly lumps of limestone or other calcareous material are caused to rub on one another by the rotation of the ball mill and in this way the surfaces of the lumps are kept clean and the calcareous material rubbed off by attrition is thoroughly mixed with and taken up by the water flowing through the mill so as to neutralize the water flowing through the mill to the extent necessary to precipitate the basic ferric sulfate therein.

The neutralized water flows from the ball mill 2 through the conduit 11 into the settling tank 12 where the salts are precipitated. The clear water in the settling tank flows through the overflow outlet 13 and the precipitated sludge, which collects in the bottom of the tank, is pumped out of the tank as required through the conduits 14 and 16 on the inlet and the discharge sides of the pump 15 and is delivered into the upper or receiving end of the rotary calcining furnace 17. The sludge in passing through the furnace is first dried and then calcined, and the sulfuric acid is vaporized and separated from the iron oxid, the reaction being shown by the equation:—

$$2Fe_2(SO_4)_3.2Fe(OH)_3 + 3H_2O + \triangle = 3Fe_2O_3 + 6H_2SO_4$$

During its passage through the lower portion of the furnace the calcined material is more or less pulverized. The so-formed iron oxid is discharged from the lower or exit end of the calcining furnace into one end of the fire place of the furnace, and as discharged thereinto is delivered upon the conveyer 37 by which it is transferred to a place of storage or into a car for shipment.

The fumes or vapor arising from the sludge in the furnace 17 are drawn through the conduit 21 on the end of the furnace 17 and are caused to pass into the body of liquid maintained in the bottom of the tank 22, which operation condenses the vapor into liquid sulfuric acid. The suction fan 24 creates a partial vacuum within the tank and in this way causes a draft or suction through the body of water and through the conduit 21 by which the tank is connected to the furnace, which draws the fumes or vapor from the upper end of the calcining furnace 17.

When required water will be supplied to the tank 22 through a suitable conduit or through the pipe 29 leading to the tank, the flow of water being controlled by the valve 30 on the pipe 29. The acid as it becomes concentrated to the desired extent is permitted to flow out of the tank through the outlet opening 26 thereof, and is collected and stored in suitable containers.

In some cases only part of the raw mine water need be passed through the ball mill 2, the balance being delivered direct to the settling tank or pit 12. In such event that portion of the water which passes through the ball mill will take up and carry sufficient calcareous material into the tank to treat the portion of the mine water that is directly discharged into the tank, as will be readily understood.

In this way a method is provided which is continuous, and by which the iron salts in the water from mines are precipitated, separated and recovered in the form of finely divided iron oxid and sulfuric acid, two salable commodities for which there is a ready market.

The advantages of our invention will be apparent to those skilled in the art. By employing our improved method of treating mine water, the water is purified and the iron oxid and sulfuric acid in the water as received from the mine are separated and recovered as commercial commodities having a market value and a heretofore waste product is converted into products for which there is a ready sale, at a cost which makes the method profitable.

The sale of the iron oxid and acid will more than cover the cost or treating the mine water in the ball mill in neutralizing the water, and the objections to allowing the mine water to flow into adjacent streams are removed without cost.

Modifications in the construction and arrangement of the apparatus and in the steps of the method may be made within the scope of our invention as described in the specification and covered in the appended claims.

We claim:

1. That way of treating acid mine water containing ferric sulfate, which consists in adding comminuted calcareous material to the water to neutralize the free acid and precipitate basic ferric sulfate, regulating the addition of calcareous material to avoid decomposition of the basic ferric sulfate, separating the precipitated sludge from the body of treated water, calcining the sludge to recover the iron oxid and vaporize the sulfuric acid, and liquefying the vapor to collect and recover the acid.

2. That way of treating acid mine water containing ferric sulfate, which consists in adding sufficient comminuted calcareous material to the water to neutralize the free acid and precipitate basic ferric fulfate, separating the precipitated sludge from the body of treated water, calcining the sludge to vaporize the sulfuric acid, and liquefying the vapor to collect and recover the acid.

3. That way of treating acid mine water containing ferric sulfate, which consists in adding sufficient comminuted calcareous material to the water to neutralize the free acid and precipitate basic ferric sulfate, separating the precipitated sludge from the body of treated water, heating the sludge to vaporize the sulfuric acid therein, and liquefying the vaporized acid.

In testimony whereof we have hereunto set our hands.

JAMES R. CAMPBELL.
ADDISON F. HOFFMAN.

Witnesses to the signature of James R. Campbell:
J. R. SMITH,
JESSE S. COOK.

Witnesses to the signature of Addison F. Hoffman:
A. H. COBLE,
R. N. McELHENY.